(No Model.) 3 Sheets—Sheet 1.
G. S. LONG.
AUTOMATIC WINDMILL REGULATOR.
No. 601,152. Patented Mar. 22, 1898.

Witnesses
Craige C. Kennedy
Samuel L. Potter

Inventor George Silas Long

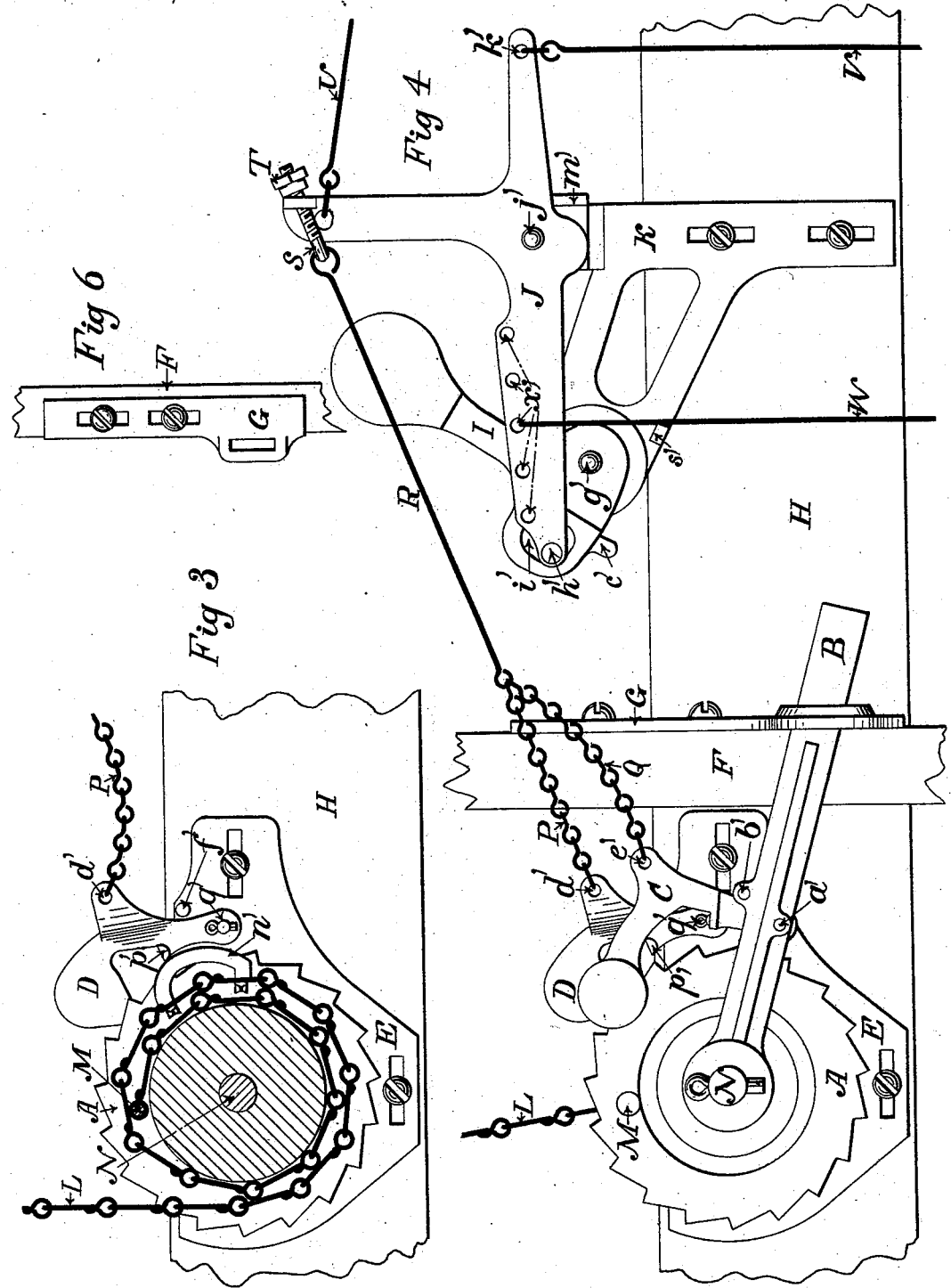

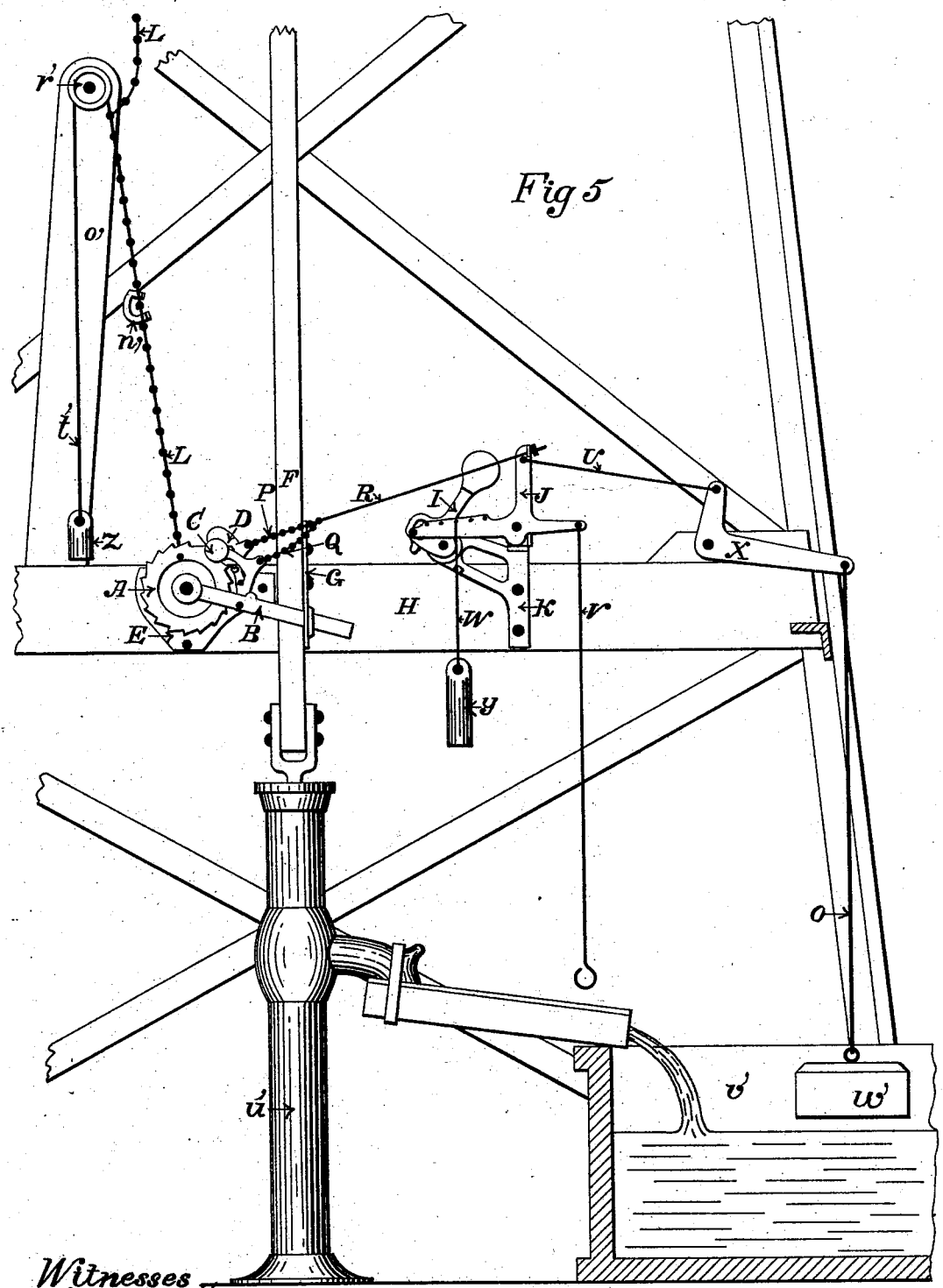

UNITED STATES PATENT OFFICE.

GEORGE SILAS LONG, OF HINCKLEY, ILLINOIS.

AUTOMATIC WINDMILL-REGULATOR.

SPECIFICATION forming part of Letters Patent No. 601,152, dated March 22, 1898.

Application filed March 13, 1897. Serial No. 627,267. (No model.)

*To all whom it may concern:*

Be it known that I, GEORGE SILAS LONG, a citizen of the United States, residing at Hinckley, in the county of De Kalb and State of Illinois, have invented certain new and useful Improvements in Automatic Windmill-Regulators, of which the following is a specification.

The invention is embodied in improved mechanism or apparatus for automatically throwing wind-wheels proper out of or into action—that is to say, out of or into the wind—for the purpose of stopping or pumping of water.

Figure 1:
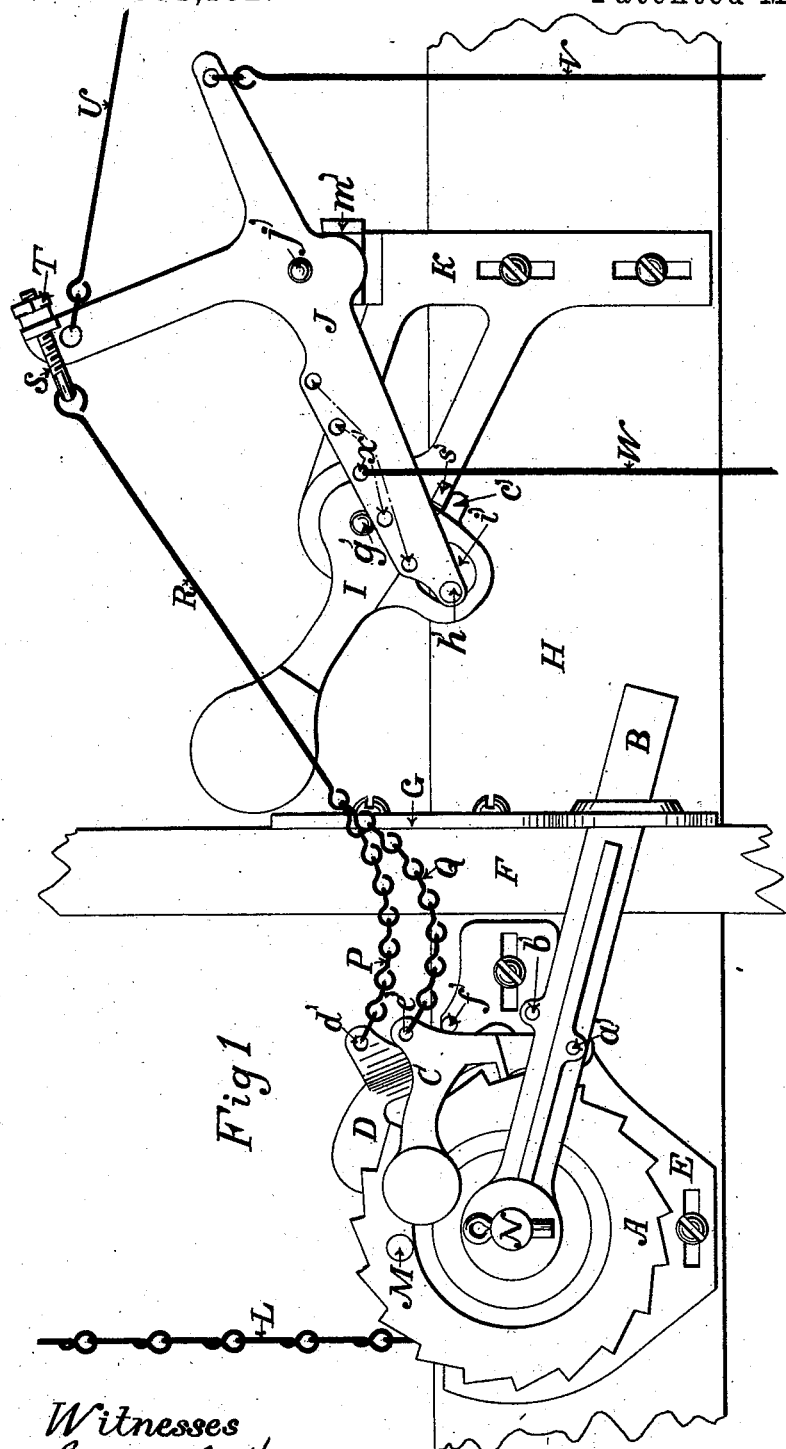
Figure 2:
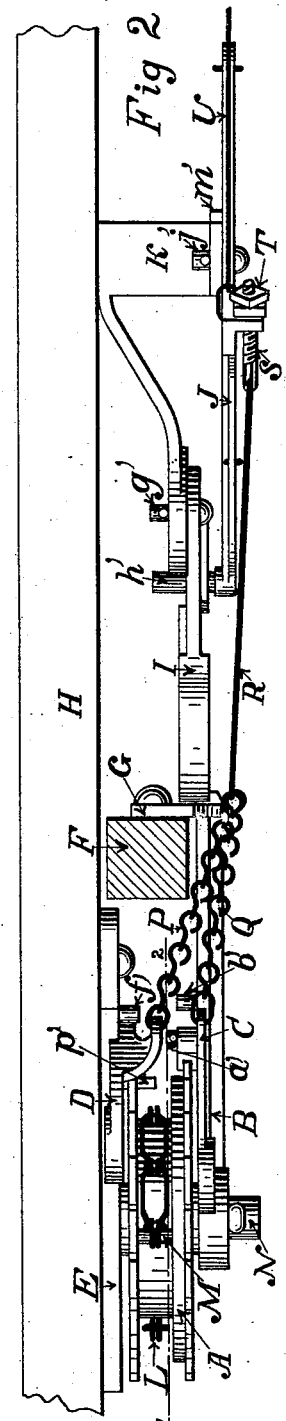

In the accompanying drawings, Figure 1 is a side view of that portion of my invention which is more directly connected with the wheel, the regulator being shown in gear and pulling the wheel out of the wind. Fig. 2 is a plan view of the same. Fig. 3 is a vertical section of the ratchet-wheel and shaft. Fig. 4 is a side view showing the regulator thrown out of gear, so that the mill is allowed to pump. Fig. 5 is a side view of the entire apparatus, the mill being in operation. Fig. 6 is a detail side view showing the device which connects the pump-rod with the regulator proper.

As shown in Fig. 5, an ordinary pump-stock $u$ is provided with a reciprocating rod F, and the water raised by the pump is delivered into a tank $v'$, in which a float $w'$ is suspended by a rod or wire $o$ from a pivoted elbow-lever X. The wind-wheel proper is not shown, since it forms no part of the invention and its operation will be readily understood. I connect a three-armed or inverted-T-shaped lever J with the aforesaid elbow-lever X by means of a wire U and with two pawls C and D, coacting with the ratchet-disks A, by means of a wire R and chains Q P. In other words, the T-lever J is intermediate of and connected with the lever X and pawl-and-ratchet mechanism specified. The levers and pawl-and-ratchet mechanism are attached to a horizontal beam H, that is preferably secured to the windmill-tower. The T-shaped lever J is pivoted at $j'$ on a bracket K, arranged vertically and having vertical slots, Fig. 4, through which pass attaching-bolts. Thus the bracket K may be adjusted as required. The bracket K has a lateral arm, to which a weighted lever I is pivoted at $g'$. Said lever has an opening $i'$ in its broad base portion, and the longer horizontal arm of the lever J has a lateral pin $h$, that projects into and works in said opening $i'$. The lever I has a base-lug $c'$, that engages a lug $s'$ on bracket K when the said lever is thrown over into the position shown in Fig. 1. The T-lever J is also arrested by a lug $m'$ on bracket K when thrown to the position shown in Figs. 4 and 5. A weight Y is suspended by a wire W from the left-hand arm of the T-lever J, and the said wire may be attached at different points $x'$ to provide for taking up the slack of wires $o$ U when the float $w'$ rises.

The furl wire or chain L, Fig. 5, of the wind-wheel proper is attached at M, Fig. 3, to the hub of the parallel ratchet-disks A, which rotate on a horizontal spindle N, that projects from a plate E, having horizontal slots, through which pass attaching-bolts. Such slots permit adjustment of said plate E farther from or nearer to the T-lever J, as may be required. The weighted locking-pawl D is pivoted at $q'$, Fig. 3, to the plate E, so that its shoulder $p'$, Fig. 3, may engage the inner ratchet-disk. The weighted push-pawl C is pivoted at $a'$ to a lever B, which is in turn pivoted on the journal N and connected slidably at its free end with the pump-rod F. Such connection is effected by a plate G, Fig. 6, having a slot to receive the lever B and other slots to provide for vertical adjustment on the pump-rod. A cord $t'$, Fig. 5, carrying a weight $z$, is connected with the chain L and passes over a pulley $r'$. Such cord and weight serve to take up any slack that might occur in the chain. A pawl lifting or disengaging device $n'$, Fig. 5, is also attached to the chain L. The same consists of a short curved bar whose ends pass through and are secured in links of said chain. A stud or lug $f$, Figs. 1 and 3, limits the backward movement of locking-pawl D, and a lateral lug $b$, Figs. 2 and 4, similarly limits the push-pawl C.

The operation of the apparatus is as follows: As shown in Fig. 5, the float $w'$ is suspended by wire $o$, and the T-lever J and its weighted locking-lever I are in the position required to apply tension to the wire R and chains P Q, and thus hold the pawls D C retracted or free from engagement with the ratchet-disks A. Hence the said disks and their connecting-hub are free to rotate, and there is no tension on the chain L, so that the wind-wheel proper is allowed to work in the wind. Consequently the pump is working and water is being raised and delivered into tank v'. When, however, the water rises high enough, it will support and raise the float w', which will allow weight Y to pull the T-lever J over far enough to throw the weighted lever I to the left, as shown in Figs. 1 and 4, thus releasing tension on wire R and chains P Q, so that the pawls D C engage the ratchets A'. Then, since the lever B is raised at every upstroke of the pump-rod F, the push-pawl C will be raised also and turn the disks A the distance of the space between any two of their teeth, thereby winding up the chain L, and the pawl D will at the same time lock inner disk A and prevent the chain unwinding. Thus every oscillation of the lever B effects the winding on of the chain L and pulls wind-wheel out of the wind until the pawl-lifter n' reaches the position shown in Fig. 3—that is to say, until it slides under the locking-pawl D and holds it disengaged from the adjacent ratchet A. In this case if there be further reciprocation of the pump-rod F the ratchets A will obviously oscillate without further winding on the chain L. When the water in tank v' falls, the weighted float w' will descend also and thereby pull the elbow-lever X and T-lever J back to the original position, (shown in Figs. 4 and 5,) and the weighted attachment I will again fall over to the right and lock the T-lever as before, while the renewed tension on wire R and chains P Q will pull the pawls D C out of engagement with the disks A, so that the latter are free to rotate and allow the chain L to unwind and leave the wind-wheel free to go into the wind as required to work the pump. Thus the action of the pump is automatically and effectively regulated. I prefer to make the float w' of copper or galvanized iron and fill it with sand, so that it will be quite heavy. A pull-wire V is attached at k' to the right-hand arm of lever J for use in pulling the latter back manually into position to release the regulator and allow the mill to work whenever it is desired to raise water after the tank v' is full.

As shown in Figs. 1 and 4, the practical length of wire R may be regulated by a screw S and nuts T to cause the pawls C D to begin to engage the ratchet-disks A just as the weighted lever I begins to fall from a vertical position, (shown in Fig. 1,) whereby the pawls are enabled to act more promptly than would be otherwise the case. In case the push-pawl C does not turn the ratchet-disks A far enough to let holding-pawl D drop into the adjacent ratchet the plate E is adjusted nearer the pump-rod F, or instead the plate G on the latter may be set higher, whichever is desirable. On the other hand, if the pawl C carries the ratchets A too far the plate E is adjusted farther from the pump-rod F or the plate is lowered on the latter.

What I claim is—

1. In a windmill-regulator, the combination with the rotatable ratchet-disks, the wind-wheel chain winding on the hub of said disks, the pump-rod, lever B, and weighted push and locking pawls, acting on said disks, of the pivoted T-lever, the pivoted weighted locking-lever connected with said T-lever, the wire and chains connecting such T-lever with the pawls, the elbow-lever and float, and a balance-weight for said float, which is connected with the T-lever, as shown and described, to operate as specified.

2. In a windmill-regulator, the combination with the pump-rod, the wind-wheel pull-chain, ratchet-disks, the push and locking pawls acting thereon, the T-lever and its weighted locking-lever I, connections between the said pawls and T-lever, the pump-rod, a lever to which the push-pawl is pivoted, and a bearing for the disks which is adjustable toward and from the pump-rod, as shown and described, for the purpose specified.

3. In a windmill-regulator, the combination with float, elbow-lever, and ratchet-and-pawl mechanism, of the pivoted inverted-T lever, its weighted locking-lever I, stops for the lever and attachment, connections between the T-lever and other parts as specified, the weight adjustably connected with such lever, and a pull-cord v, all as shown and described, to operate as specified.

GEORGE SILAS LONG. [L. S.]

Witnesses:
CRAIGE C. KENNEDY,
SAMUEL L. POTTER.